United States Patent [19]

Steinhauser et al.

[11] Patent Number: 4,839,103
[45] Date of Patent: Jun. 13, 1989

[54] METHOD FOR OBTAINING A SOLUTION OF NUCLEAR FUEL NOT READILY DISSOVABLE, ESPECIALLY OF PUOHD 2 OR (U/PU)O₂ MIXED OXIDE

[75] Inventors: Michael Steinhauser, Eichenau; Günter Hoffmann, Munich; Fritz Weigel, deceased, late of Munich, Anne Weigel, Matthias Weigel, heirs; Kurt Wittmann, Erlensee; Dieter Schäfer, Leidersbach, all of Fed. Rep. of Germany

[73] Assignee: Alkem GmbH, Hanau, Fed. Rep. of Germany

[21] Appl. No.: 5,832

[22] Filed: Jan. 21, 1987

[30] Foreign Application Priority Data

Jan. 22, 1986 [DE] Fed. Rep. of Germany ....... 3601826

[51] Int. Cl.⁴ .................... C09K 11/04; G21G 4/00; C01G 56/00; C01G 43/025
[52] U.S. Cl. .................................. 252/643; 252/627; 252/634; 423/20; 423/251; 423/261
[58] Field of Search .............. 252/626, 627, 631, 634, 252/636, 643; 423/2, 3, 4, 18, 20, 251, 253, 254, 260, 261

[56] References Cited

U.S. PATENT DOCUMENTS

| | | | |
|---|---|---|---|
| 3,034,868 | 5/1962 | Erickson | 423/251 |
| 3,794,470 | 2/1974 | Meyer et al. | 423/251 |
| 3,976,775 | 8/1976 | Tallent | 423/251 |
| 4,069,293 | 1/1978 | Tallent | 423/3 |
| 4,092,397 | 5/1978 | Brambilla et al. | 423/5 |
| 4,105,683 | 8/1978 | Germain | 423/251 |
| 4,247,495 | 1/1981 | Ennerst et al. | 264/0.5 |
| 4,333,912 | 6/1982 | Mills et al. | 423/20 |
| 4,434,137 | 2/1984 | Stoll et al. | 423/6 |
| 4,528,130 | 7/1985 | Ledebrink et al. | 252/643 |
| 4,591,488 | 5/1986 | Heckmann et al. | 423/11 |
| 4,609,533 | 9/1986 | Heckmann et al. | 423/18 |
| 4,686,019 | 8/1987 | Ryan et al. | 204/1.5 |

FOREIGN PATENT DOCUMENTS 0049827  5/1980  European Pat. Off. .

Primary Examiner—Howard J. Locker
Attorney, Agent, or Firm—Herbert L. Lerner; Laurence A. Greenberg

[57] ABSTRACT

Not readily dissolvable nuclear fuel is dissolved in an airtight closed vessel or autoclave. Nitric acid is evaporated and condensed in the vessel and the nitric acid condensate trickles over the nuclear fuel disposed outside of the nitric acid undergoing evaporation.

3 Claims, 2 Drawing Sheets

METHOD FOR OBTAINING A SOLUTION OF NUCLEAR FUEL NOT READILY DISSOVABLE, ESPECIALLY OF PUOHD 2 OR (U/PU)O$_2$ MIXED OXIDE

BACKGROUND OF THE INVENTION

1. Field of the Invention

The invention relates to a method for obtaining a solution of nuclear fuel not readily dissolvable, especially of PuO$_2$ or (U/Pu)O$_2$ mixed oxide in nitric acid within an airtight sealed vessel (autoclave).

2. Description of the Prior Art

A method of dissolving nuclear fuel is disclosed in European Patent No. 00 49 827 and equivalent U.S. Pat. No. 4,528,130. According to this method a suspension of PuO$_2$ or (U/Pu)O$_2$ mixed oxide in concentrated nitric acid is heated in an autoclave. The nitric acid together with the nuclear fuel is stirred and mixed inside the airtight closed autoclave. The temperature of the nuclear fuel and the nitric acid advantageously is the same or higher than the boiling temperature of nitric acid at normal pressure (atmospheric pressure).

With this method, for example, 4 g PuO$_2$ in 30 ml concentrated nitric acid could be dissolved at approximately 200° C. in about 20 hours. This resulted in a final concentration of 130 g plutonium per liter of solution.

Considerably higher plutonium contents in the solution cannot be obtained with the known method, because the solution rate drops toward zero given a stronger concentration of plutonium in the solution.

SUMMARY OF THE INVENTION

It is an object of the invention to further develop the known method and to achieve higher nuclear fuel concentrations in the nitric acid solution.

With the foregoing and other objects in view, there is provided in accordance with the invention a method for obtaining a solution of nuclear fuel not readily dissolvable, especially PuO$_2$ or (U/Pu)O$_2$, in nitric acid, which comprises, disposing a body of nitric acid in an airtight closed vessel and also disposing a nuclear fuel not readily dissolvable in said closed vessel outside the body of nitric acid, heating the nitric acid to effect evaporation of the nitric acid inside the vessel, condensing the vapors of nitric acid to form a fresh nitric acid condensate, and trickling the fresh nitric acid condensate over the nuclear fuel not readily dissolvable to effect dissolution of the nuclear fuel.

Other features which are considered as characteristic for the invention are set forth in the appended claims.

Although the invention is illustrated and described herein as embodied in a method for obtaining a solution of nuclear fuel not readily dissolvable, especially of PuO$_2$ or (U/Pu)O$_2$ mixed oxide, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DESCRIPTION OF THE PREFERRED EMBODIMENTS

Figure 1:
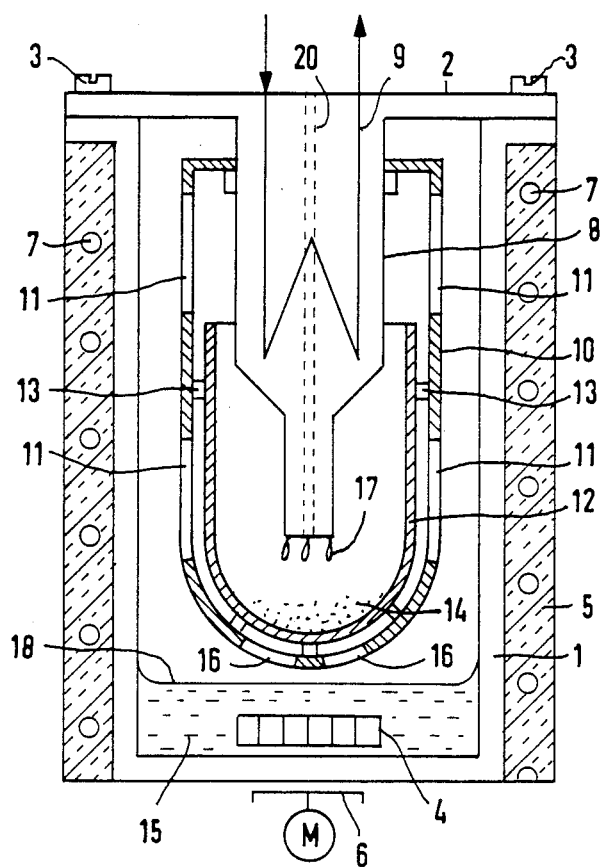
FIG. 1 shows an autoclave for a method according to the invention represented largely schematically in longitudinal cross section.

In accordance with the invention, the nitric acid is vaporized in the vessel and condensed and the fresh nitric acid condensate trickles over the nuclear fuel outside of the solution.

In this way nitric acid free of nuclear fuel always is available for dissolving the nuclear fuel, wherein the dissolving rate for the nuclear fuel attains its largest value. This even makes possible the attainment of concentrations of not readily dissolvable nuclear fuel in nitric acid corresponding to the maximum solubility of nuclear fuel in nitric acid under normal conditions (ambient temperature and atmospheric pressure).

It is especially advantageous for the preparation of nuclear fuel-free nitric acid if it trickles over the nuclear fuel without causing it to float.

It is of further advantage if an airtight closed vessel is used, wherein the nuclear fuel is placed on a porous carrier underneath a cooled body whereon evaporated nitric acid condenses. A nitric acid circulation can be maintained in such a vessel by simple means.

The invention and its advantages are further described by means of an exemplary embodiment referring to the drawings.

The autoclave 1 shown in FIG. 1 is closed airtight by a lid 2 by means of screws 3. The autoclave 1 has on the outside a ceramic casing 5, wherein electrical heating coils 7 are disposed, by means of which the autoclave 1 is heated. On the inside at the bottom of the autoclave 1 is disposed an agitator 4, with which is associated on the outside of the bottom an electromagnet 6 driving the agitator 4 via magnetic coupling.

The autoclave 1 and the lid 2 are made of highgrade steel. Their insides are provided with a coating, not shown, of polytetrafluoroethylene, which is nitric acid resistant. Furthermore, a cooling sleeve 8 of highgrade steel is disposed on the inside of the lid 2, also having a coating, not shown, of polytetrafluoroethylene. A conduit 9 is disposed inside this cooling sleeve 8, through which can flow a cooling medium, for instance water.

On the outside of the cooling sleeve 8 hangs a basket 10 of polytetrafluoroethylene with slits 11 on the casing and slits 16 on the bottom. A beaker 12, open on top, of fiberglass felt is disposed at a distance inside this basket 10. The distance is maintained by spacers 13 of polytetrafluoroethylene between the beaker 12 and the basket 10.

The cooling sleeve 8 extends inside the beaker 12 with a narrowing end. In the bottom of the beaker 12 and on the inside is disposed powdered nuclear fuel 14, consisting of, for example, PuO$_2$, for which the beaker 12 serves as a porous carrier.

The autoclave 1 is filled on the inside at the bottom with concentrated nitric acid 15. The level 18 of the nitric acid is at a distance from the basket 10. The nitric acid 15 is stirred by the agitator 4. The nitric acid 15 advantageously is free of fluoride, so that during the subsequent processing of the solution the working parts are not stressed by corrosion and the consecutive chemical processes are not hampered.

During heating of the autoclave 1 by the electrical heating coils 7, nitric acid 15 steadily evaporates and gains, in vapor form the inside of the basket 10 through the slits 11 and 16. The evaporated nitric acid condenses on the outside of the cooling sleeve 8. Fresh nitric acid condensate not containing dissolved $PuO_2$ drops from the cooling sleeve 8, and steadily falls on the $PuO_2$ powder 14 which is above the level 18 of the nitric acid 15 and thereby outside of the solution represented by the nitric acid 15 at the bottom of the beaker 12. This powdered $PuO_2$ therefore is sprinkled with drops 17 of fresh nitric acid condensate and passed through continuously by the fresh nitric acid condensate without the $PuO_2$ powder 14 being floated up. The nitric acid condensate 17 dissolves the $PuO_2$ 14, the resultant liquid solution penetrates the walls of the beaker 12 and drips through the slits 16 at the bottom of the basket 10 back into the nitric acid 15 at the bottom of the autoclave 1. By maintaining this nitric acid circulation for a sufficient amount of time the entire amount of $PuO_2$ 14 at the bottom of the beaker 12 is dissolved in the nitric acid 15.

The autoclave 1 is advantageously heated such that the drops 17 of fresh nitric acid condensate have a temperature in the range of from 150° C. to 250° C. A corresponding overpressure then is present inside the autoclave.

Figure 2:
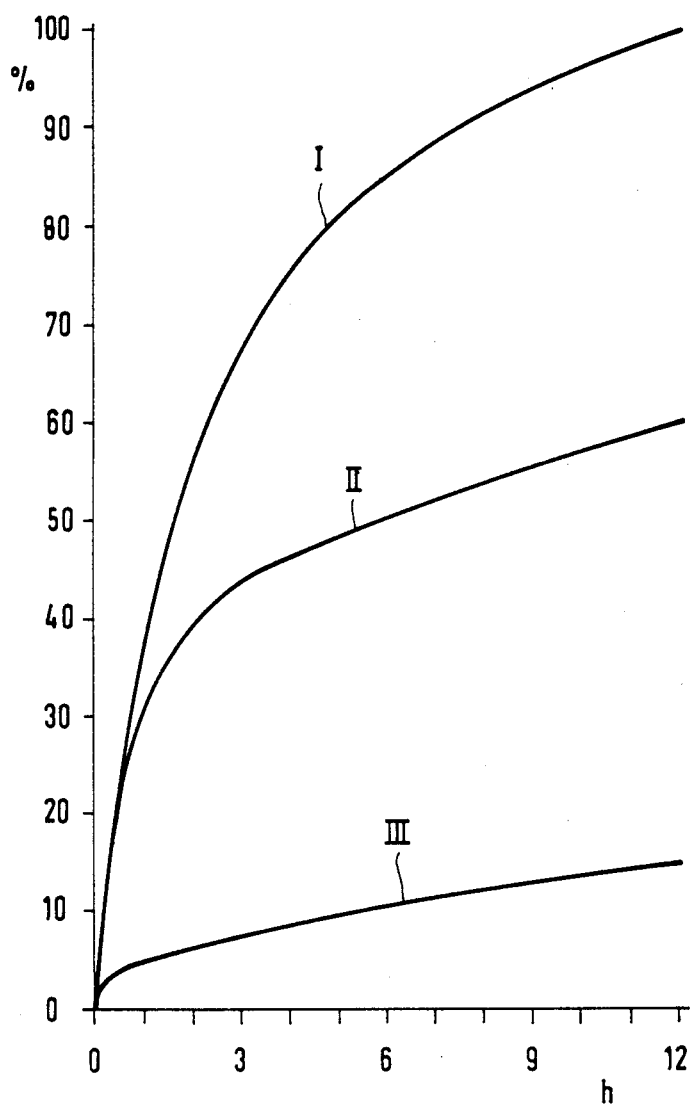
FIG. 2 shows dissolving rates, that is, rates of PuO$_2$ dissolved in terms of percent weight plotted against dissolving time in hours under three sets of conditions as shown in curve I, curve II and curve III.

In the diagram according to FIG. 2, dissolved $PuO_2$ amounts are shown in percent of weight over a dissolving time in hours.

The curve I in FIG. 2 was determined in connection with an airtight closed autoclave 1 according to FIG. 1 using a method according to the invention, in which 5 g of powdered $PuO_2$ were dissolved at the bottom of the beaker 12 by the drops 17 of nitric acid condensate at a temperature of 220° C. The starting amount of concentrated nitric acid 15 was 20 ml. The entire amount of $PuO_2$ was dissolved after 12 hours and a final concentration of 250 g plutonium per liter of solution resulted.

As a comparison, an equal amount of the same powdered $PuO_2$ was mixed with an equal amount of concentrated nitric acid and the suspension was heated in an airtight closed autoclave to 220° C. The rate of dissolving is represented by the curve II in FIG. 2, which shows that after 12 hours a solution concentration of only 130 g per liter of solution resulted which did not increase even after a longer solution time.

Finally, the same amount of the same powdered $PuO_2$ at the bottom of the beaker 12 and the same amount of concentrated nitric acid 15 were treated in an autoclave 1 in accordance with FIG. 1. Although the lid 2 closed the autoclave 1 airtight, a thin pressure equalizing channel 20, shown by a dashed line in FIG. 1, was conducted to the outside, so that atmospheric pressure always prevailed inside the autoclave 1. The concentrated nitric acid 15 at the bottom of the autoclave 1 therefore could only be heated to boiling at normal pressure (approximately to 120° C.), and the drops 17 of fresh nitric acid condensate falling on the powdered $PuO_2$ accordingly only had a temperature below the boiling point.

The resulting dissolving rate is represented by the curve III in FIG. 2. After 12 hours the concentration of plutonium in the solution was only about 15 g per liter. This solution concentration could not be increased by additional solution time.

It was shown that the dissolving rate achieved by means of the method according to the invention corresponding to the curve I in FIG. 2 is also considerably higher than the sum of the dissolving rates corresponding to curves II and III.

We claim:

1. A method for obtaining a solution of a nuclear fuel formed of $PuO_2$ or $(U/Pu)O_2$ not readily dissolvable in nitric acid, which comprises, disposing a body of nitric acid in an airtight closed vessel and also disposing the nuclear fuel not readily dissolvable in said closed vessel outside the body of nitric acid, heating the nitric acid to effect evaporation of the nitric acid inside the vessel, condensing the vapors of nitric acid to form a fresh nitric acid condensate, and trickling the fresh nitric acid condensate over the nuclear fuel not readily dissolvable to effect dissolution of the nuclear fuel, adjusting the condensate flow on the nuclear fuel to trickle over the nuclear fuel without causing the nuclear fuel to float, and adjusting the resultant liquid solution to drip back into the nitric acid condensate.

2. A method in accordance with claim 1, wherein the temperature of the fresh nitric acid condesate is adjusted to a value in the area of between 150° C. and 250° C.

3. A method in accordance with claim 1, wherein the nuclear fuel in the airtight closed vessel is disposed on a porous carrier, and above the nuclear fuel is a cooled body, on which the evaporated nitric acid condenses.

* * * * *